(12) United States Patent
Fujisawa et al.

(10) Patent No.: US 8,487,457 B2
(45) Date of Patent: Jul. 16, 2013

(54) ENGINE SYSTEM

(75) Inventors: Toshinobu Fujisawa, Osaka (JP); Tatsuya Kawano, Osaka (JP); Masaaki Ono, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 0 days.

(21) Appl. No.: 13/391,739

(22) PCT Filed: Aug. 17, 2010

(86) PCT No.: PCT/JP2010/063845
§ 371 (c)(1),
(2), (4) Date: Feb. 22, 2012

(87) PCT Pub. No.: WO2011/024668
PCT Pub. Date: Mar. 3, 2011

(65) Prior Publication Data
US 2012/0153637 A1  Jun. 21, 2012

(30) Foreign Application Priority Data
Aug. 27, 2009 (JP) .................................. 2009-196582

(51) Int. Cl.
*F02N 11/00* (2006.01)
(52) U.S. Cl.
USPC ...................................................... 290/38 R
(58) Field of Classification Search
USPC ...................................................... 290/38 R
See application file for complete search history.

(56) References Cited

U.S. PATENT DOCUMENTS

| | | | | |
|---|---|---|---|---|
| 5,111,057 A | * | 5/1992 | Sugiyama | 290/38 R |
| 5,146,095 A | * | 9/1992 | Tsuchiya et al. | 290/38 R |
| 5,157,267 A | * | 10/1992 | Shirata et al. | 290/38 R |
| 5,345,901 A | * | 9/1994 | Siegenthaler et al. | 123/179.3 |
| 5,455,463 A | * | 10/1995 | Langnickel et al. | 307/10.1 |
| 7,432,608 B2 | * | 10/2008 | Okubo et al. | 290/38 R |

FOREIGN PATENT DOCUMENTS

| | | |
|---|---|---|
| JP | 11-164559 A | 6/1999 |
| JP | 2001-352681 A | 12/2001 |
| JP | 2007-174719 A | 7/2007 |

OTHER PUBLICATIONS

International Search Report dated Nov. 22, 2010, issued for PCT/JP2010/063845.

* cited by examiner

*Primary Examiner* — Tho D Ta
(74) *Attorney, Agent, or Firm* — Edwards Wildman Palmer LLP

(57) ABSTRACT

To provide an engine system with which in a case where a power supply voltage whose specification is to be changed is higher than an expected voltage, the specification of the power supply voltage from an alternating-current power supply can be changed at low cost without providing an additional transformer.

An engine system 100 includes a transformer 130, a power receiving device 140, and a switcher 150, and switcher 150 connects a switching terminal 151 connected to one power receiving terminal 141 of the power receiving device 140 to either a first terminal 152 connected to one terminal 134 of a primary 131 or a second terminal 153 connected to a branch terminal 136. The engine system 100 is configured such that the other power receiving terminal 142 of the power receiving device 140 and the other terminal 135 of the primary 131 are connected and the primary 131 and an alternating-current power supply 200 are electrically connected.

1 Claim, 1 Drawing Sheet

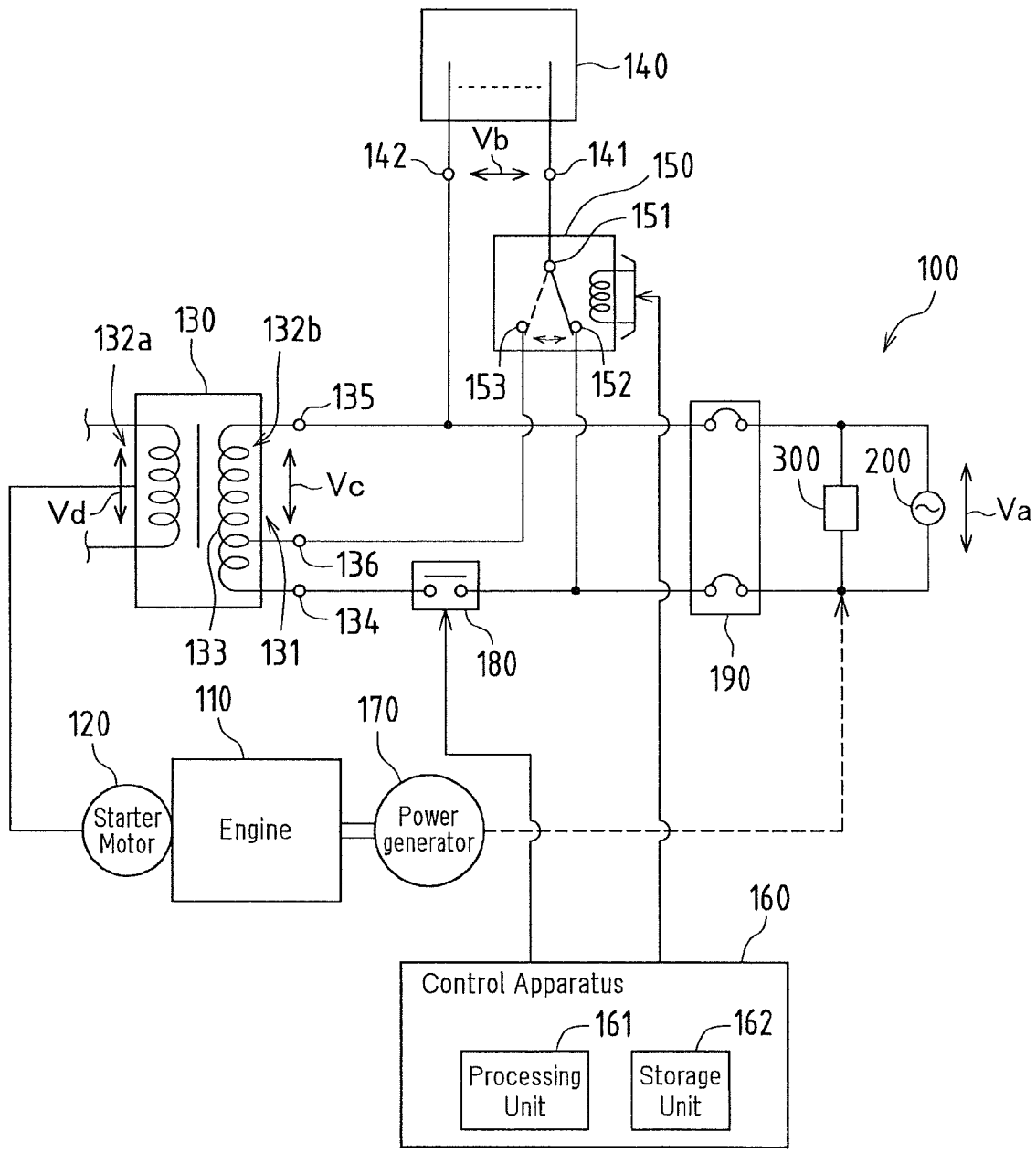

ENGINE SYSTEM

TECHNICAL FIELD

The present invention relates to an engine system that supplies energy, such as electric energy or thermal energy, obtained as a result of conversion of an output from an engine, to the outside, and in particular to an engine system, such as an engine generation system or engine heat pump system, provided with a starting transformer that outputs a driving voltage to a starter motor for starting an engine.

BACKGROUND ART

There are cases in which, for example, conventional engine systems are provided with a power supply line (for example, an AC 200 V line for those customized for Japan, and an AC 230 V line or AC 240 V line for those customized for Europe) with which a power supply voltage from an alternating-current power supply is supplied and a system line (for example, a DC 24 V line) with which a voltage obtained as a result of reduction of the power supply voltage from the alternating-current power supply is supplied.

Generally, with the system line, the power supply voltage (for example, AC 200 V for those customized for Japan) from the alternating-current power supply is reduced by a transformer, and an alternating voltage obtained as a result of the voltage reduction by the transformer is rectified to give a direct current voltage (for example, DC 24 V). The system line is usually connected to a starter motor for starting an engine. Other examples that can be connected to the system line include a control apparatus and an electrical device such as a relay or a solenoid valve.

Examples that can be connected to the power supply line include a power receiving device such as a motor of a cooling water pump or a cooling fan, that receives the voltage supplied from the alternating-current power supply.

When producing engine systems intended for different destinations, from the viewpoint of reducing the production cost, attempts have been made to use as many common constituent elements as possible in the systems regardless of the destination. In other words, in order to change the specification (for example, AC 200 V for those customized for Japan, or AC 230 V or AC 240 V for those customized for Europe) of the power supply voltage from the alternating-current power supply depending on the destination (for example, Japan or Europe), efforts have been made to minimize changes of the constituent elements in the engine systems.

With respect to the system line, for example, an autotransformer that shares a part of winding between the primary and the secondary is used as a transformer to which the power supply voltage from the alternating-current power supply is supplied, the power supply voltage whose specification is to be changed is input across two terminals in a shunt winding path and across two terminals in a path of the primary (for example, AC 200 V across the terminals in the shunt winding path for those customized for Japan, and AC 230 V or AC 240 V across the terminals in the path of the primary for those customized for Europe), and a constant voltage (for example, DC 24 V) is output by the secondary, whereby the specification of the power supply voltage from the alternating-current power supply can be changed depending on the destination.

Patent Document 1 is an example of the reference documents in the relevant technical field. Specifically, Patent Document 1 discloses a secondary voltage regulation circuit that is made up of a combination of an autotransformer, which shares a part of winding between the primary and the secondary, and a variable alternating-current power supply, and that is configured such that the voltage on the load side, specifically, the voltage of the secondary remains constant even when there is a change in the voltage on the alternating-current power supply side, specifically, the voltage of the primary.

With respect to the power supply line, on the other hand, basically, the voltage supplied from the alternating-current power supply is directly supplied to the power receiving device. Accordingly, in order to change the specification of the power supply voltage from the alternating-current power supply depending on the destination, it is necessary to provide an additional transformer between the transformer used by the system line and the alternating-current power supply. This configuration enables the specification of the power supply voltage from the alternating-current power supply to be changed depending on the destination, but it would increase the production cost accordingly. Nonetheless, if the specification of the power supply voltage from the alternating-current power supply is not changed for the power supply line, it would cause harmful effects on the performance of the power receiving device or the operation of the power receiving device.

In particular, in the case where the power supply voltage whose specification is to be changed is higher (for example, AC 230 V or AC 240 V for Europe) than the expected voltage (for example, AC 200 V, which is a voltage allowed by the power receiving device customized for Japan), a voltage exceeding the allowable voltage is supplied to the power receiving device, and therefore it is not desirable.

Under such circumstances, there is demand to change the specification of the power supply voltage from the alternating-current power supply depending on the destination by using the transformer used by the system line without providing an additional transformer to the power supply line.
Prior Art Document
Patent Document
[Patent Document 1] JP 11-164559A

SUMMARY OF INVENTION

Problems to be Solved by the Invention

In view of the above, it is an object of the present invention to provide an engine system with which in a case where a power supply voltage whose specification is to be changed is higher than an expected voltage, the specification of the power supply voltage from an alternating-current power supply can be changed at low cost without providing an additional transformer.

Means for Solving the Problems

In order to solve the problems described above, the present invention provides an engine system including: a starter motor that starts an engine; a transformer in which a driving voltage to the starter motor is an output of a secondary and a branch terminal is provided along a path of a primary; a power receiving device that receives a voltage supplied from an alternating-current power supply; and a switcher that connects a switching terminal that is connected to one power receiving terminal of the power receiving device to either a first terminal that is connected to one of two terminals in the path of the primary or a second terminal that is connected to the branch terminal of the transformer, wherein the other power receiving terminal of the power receiving device and the other of the terminals in the path of the primary are connected, the terminals in the path of the primary and the alternating-current power supply are electrically connected, and an open/close relay is provided in at least one of connecting paths between the terminals in the path of the primary and the alternating-current power source, the one power receiving terminal of the power receiving device and the second terminal of the switcher are connected if the open/close relay is closed, and the one power receiving terminal of the power receiving device and the first terminal of the switcher are connected if the open/close relay is open.

With the engine system of the present invention, it is only necessary to provide a switcher as described above instead of providing an additional transformer, and therefore the cost will be low.

Also, the power supply voltage from the alternating-current power supply is used as a voltage of the primary across two terminals in the transformer, and a voltage of the secondary across two terminals in the shunt winding path in the transformer is applied to the power receiving device. Also, an autotransformer is used as the transformer. It is therefore possible to suppress the voltage across the terminals in the shunt winding path in the transformer to a level lower than the voltage across the terminals in the transformer.

Thus, for example, if the voltage across the terminals in the shunt winding path in the transformer is set to a level approximately equal to the expected voltage (a voltage allowed by the power receiving device), then, when the power supply voltage whose specification is to be changed is higher than the expected voltage, the switcher connects the one power receiving terminal of the power receiving device and the branch terminal of the transformer, as a result of which the power supply voltage whose specification is to be changed can be suppressed to a level approximately equal to the expected voltage between the terminals in the shunt winding path of the transformer.

In addition, an open/close relay is provided in at least one of connecting paths between the terminals in the path of the primary and the alternating-current power source, the one power receiving terminal of the power receiving device and the second terminal of the switcher are connected if the open/close relay is closed, and the one power receiving terminal of the power receiving device and the first terminal of the switcher are connected if the open/close relay is open.

By doing so, when the terminals in the path of the primary are electrically connected to the alternating-current power supply, or in other words, when the engine is started, the switcher connects the one power receiving terminal of the power receiving device and the branch terminal of the transformer, and therefore the power supply voltage whose specification is to be changed can be suppressed to a level approximately equal to the expected voltage (for example, a voltage allowed by the power receiving device) at the timing when the engine is started.

Effects of the Invention

As described above, according to the present invention, it is possible to provide an engine system with which in a case where a power supply voltage whose specification is to be changed is higher than an expected voltage, the specification of the power supply voltage from an alternating-current power supply can be changed at low cost without providing an additional transformer.

BRIEF DESCRIPTION OF DRAWING

FIG. 1 is a schematic diagram showing the configuration of an engine system according to an embodiment of the present invention.

MODES FOR CARRYING OUT THE INVENTION

An embodiment of the present invention will be described below with reference to the drawings. The embodiment described below is a specific example of the present invention, and thus not intended to limit the technical scope of the present invention.

FIG. 1 is a schematic diagram showing the configuration of an engine system 100 according to an embodiment of the present invention. The engine system 100 shown in FIG. 1 includes an engine 110, a starter motor 120, a transformer 130, a power receiving device 140, a switcher (switching relay in this example) 150, and a control apparatus 160.

The starter motor 120 starts the engine 110. In the transformer 130, a part of winding is shared by a primary 131 and a secondary 132a, and the transformer 130 is constituted by a series winding and a shunt winding.

In the transformer 130, a driving voltage Vd supplied to the starter motor 120 is used as an output (system line) of the secondary 132a, a branch terminal 136 is provided along a path 133 of the primary 131, and a shunt winding path between two terminals 135 and 136 serves as a shared secondary 132b that is shared with the primary 131. Here, a voltage Vc across the terminals 135 and 136 in the shunt winding path of the transformer 130 is an expected voltage (for example, AC 200 V, which is a voltage allowed by the power receiving device 140 customized for Japan).

The power receiving device 140 receives a voltage supplied from an alternating-current power supply 200 and is configured to be connected to a power supply line. The power receiving device 140 can be an auxiliary device such as a motor of a cooling water pump or cooling fan. The switcher 150 selectively switches a switching terminal 151, which is connected to a power receiving terminal 141 of the power receiving device 140, between a first terminal 152 that is connected to a terminal 134, which is one of two terminals 134 and 135 in the path 133 of the primary 131 of the transformer 130, and a second terminal 153 that is connected to the branch terminal 136 of the transformer 130.

In this example, the engine system 100 is an engine system that supplies power obtained as a result of conversion of an output from the engine 110 to a power load 300, and that interconnects to the alternating-current power supply 200 in a commercial power system. Specifically, the engine system 100 further includes a power generator 170, an open/close relay 180 and an interrupting device 190.

In the transformer 130, the secondary 132a is connected to the starter motor 120 and supplies the driving voltage Vd of the secondary 132a to the starter motor 120. Upon receiving supply of the driving voltage Vd, the starter motor 120 starts the engine 110. The power generator 170 supplies power obtained as a result of conversion of the output from the engine 110 to the power load 300 and the alternating-current power supply 200.

Also, in the transformer 130, the terminals 134 and 135 in the path 133 of the primary 131 are connected to the alternating-current power supply 200, and a power supply voltage Va from the alternating-current power supply 200 is supplied thereto.

Another power receiving terminal 142 of the power receiving device 140 is connected to another power supply line that is connected to the terminal 135, which is the other of the terminals 134 and 135 in the path 133 of the primary 131 of the transformer 130.

Also, the engine system 100 is configured to be in a state in which the terminals 134 and 135 in the path 133 of the primary 131 of the transformer 130 are electrically connected to the alternating-current power supply 200 and in a state in which the electrical connections between the terminals 134 and 135 and the alternating-current power supply 200 are cut off. In this example, the open/close relay 180 is provided in a power supply line (one of the power supply lines in the example shown in the drawing) between the power load 300 and at least one (the terminal 134 in the example shown in the drawing) of the terminals 134 and 135 in the path 133 of the primary 131 of the transformer 130. In this example, the interrupting device (specifically, a magnet circuit breaker) 190 is provided both between the open/close relay 180 and the power load 300 and between the other terminal 135 in the path 133 and the power load 300.

The control apparatus 160 includes a processing unit 161 such as a CPU (Central Processing Unit) and a storage unit 162. The storage unit 162 includes storage memories such as a ROM (Read Only Memory) and a RAM (Random Access Memory), and stores various types of control programs, necessary functions and tables, and various types of data.

The control apparatus 160 is configured to control the operation of the switcher 150 and the open/close relay 180.

The control apparatus 160 is configured to control the operation of the switcher 150 so as to cause the switcher 150 to be in a first connected state (the state indicated by a solid line in FIG. 1) in which the switching terminal 151 and the first terminal 152 are connected and a second connected state (the state indicated by a broken line in FIG. 1) in which the switching terminal 151 and the second terminal 153 are connected. With this configuration, when a signal (for example, an OFF signal) that causes the switcher 150 to be in the first connected state has been transmitted from the control apparatus 160 to the switcher 150, the switcher 150 enters the first connected state, in which the power receiving terminal 141, which is one of the terminals of the power receiving device 140, is connected to a power supply line that is connected to the terminal 134, which is one of the terminals in the primary 131 of the transformer 130. When, on the other hand, a signal (for example, an ON signal) that causes the switcher 150 to be in the second connected state has been transmitted from the control apparatus 160 to the switcher 150, the switcher 150 enters the second connected state, in which the power receiving terminal 141, which is one of the terminals of the power receiving device 140, is connected to the branch terminal 136 of the transformer 130. The switcher 150 may be configured to be switched between the first connected state and the second connected state by a human operation.

Also, the control apparatus 160 is configured to control the operation of the open/close relay 180 so as to cause the open/close relay 180 to be in an electrically connected state in which the terminals 134 and 135 in the primary 131 of the transformer 130 and the alternating-current power supply 200 are electrically connected and a cut-off state in which the electrical connections between the terminals 134 and 135 in the primary 131 of the transformer 130 and the alternating-current power supply 200 are cut off. With this configuration, when a signal (for example, an ON signal) that causes the open/close relay 180 to be in the electrically connected state has been transmitted from the control apparatus 160 to the open/close relay 180, the open/close relay 180 enters the electrically connected state, in which the terminals 134 and 135 in the primary 131 of the transformer 130 and the alternating-current power supply 200 are electrically connected. When, on the other hand, a signal (for example, an OFF signal) that causes the open/close relay 180 to be in the cut-off state has been transmitted from the control apparatus 160 to the open/close relay 180, the open/close relay 180 enters the cut-off state, in which the electrical connections between the terminals 134 and 135 in the primary 131 of the transformer 130 and the alternating-current power supply 200 are cut off.

In the present embodiment, the control apparatus 160 is configured to, when the terminals 134 and 135 in the primary 131 of the transformer 130 and the alternating-current power supply 200 have been electrically connected (in this example, when the open/close relay 180 has entered the electrically connected state) and the engine system 100 has entered an operational state, cause the switcher 150 to be in the second connected state (the state indicated by a broken line in FIG. 1). This configuration causes the power receiving terminal 141, which is one of the terminals of the power receiving device 140, and the branch terminal 136 of the transformer 130 to connect to each other, causing a voltage Vb applied between the terminals 141 and 142 that are connected to the power receiving device 140 to be an expected voltage Vc (for example, AC 200 V).

When, on the other hand, the terminals 134 and 135 in the primary 131 of the transformer 130 and the alternating-current power supply 200 are not electrically connected (in this example, when the open/close relay 180 is in the cut-off state) and the engine system 100 has entered a standby state, the control apparatus 160 causes the switcher 150 to be in a state that is not the second connected state, in this example, to be in the first connected state (the state indicated by a solid line in FIG. 1). In the first state, the power receiving terminal 141, which is one of the terminals of the power receiving device 140, and the power supply line that is connected to the terminal 134, which is one of the terminals in the primary 131 of the transformer 130, are connected, and a voltage Va (for example, AC 230 or AC 240 V) that is higher than the expected voltage (for example, AC 200 V) is applied to the terminals 141 and 142 that are connected to the power receiving device 140, but the engine system 100 is in the standby state and the voltage Va is not supplied to the power receiving device 140, and therefore the power receiving device 140 will not be affected.

With the engine system 100 described above, it is only necessary to provide the switcher 150 instead of providing an additional transformer, and therefore the cost will be low.

The power supply voltage Va from the alternating-current power supply 200 is used as a voltage of the primary across the terminals 134 and 135 in the transformer 130, and the voltage Vc of the shared secondary 132b between the terminals 135 and 136 in the shunt winding path of the transformer 130 is set as the voltage allowed by the power receiving device 140. Also, an autotransformer is used as the transformer 130. It is therefore possible to suppress the voltage Vc of the shared secondary 132b between the terminals 135 and 136 in the shunt winding path of the transformer 130 to a level lower than the voltage Va between the terminals 134 and 135 of the transformer 130.

As described above, with the voltage Vc of the shared secondary 132b between the terminals 135 and 136 in the shunt winding path of the transformer 130 being set to the expected voltage (the voltage allowed by the power receiving device 140), if the power supply voltage Va whose specification is to be changed is higher (for example, AC 230 V or AC 240 V for Europe) than the expected voltage (for example, AC 200 V, which is a voltage allowed by the power receiving device 140 customized for Japan), the switcher 150 is caused to connect the power receiving terminal 141, which is one of the terminals of the power receiving device 140, and the branch terminal 136 of the transformer 130, whereby the power supply voltage Va (for example, AC 230 V or AC 240 V for Europe) whose specification is to be changed can be suppressed to the expected voltage (for example, AC 200 V, which is a voltage allowed by the power receiving device 140 customized for Japan) in the shared secondary 132b between the terminals 135 and 136 in the shunt winding path of the transformer 130.

Therefore, according to the engine system 100 of the embodiment of the present invention, even if the power supply voltage Va whose specification is to be changed is higher (for example, AC 230 V or AC 240 V for Europe) than the expected voltage (for example, AC 200 V, which is a voltage allowed by the power receiving device 140 customized for Japan), the specification of the power supply voltage Va can be changed at low cost without providing an additional transformer.

Also, according to the present embodiment, when the terminals 134 and 135 in the primary 131 of the transformer are electrically connected to the alternating-current power supply 200, or in other words, when the engine 110 is started, the switcher 150 is caused to connect the power receiving terminal 141, which is one of the terminals of the power receiving device 140, and the branch terminal 136 of the transformer 130, and therefore the power supply voltage Va (for example, AC 230 V or AC 240 V for Europe) whose specification is to be changed can be suppressed to the expected voltage (for example, AC 200 V, which is a voltage allowed by the power receiving device 140 customized for Japan) at the timing when the engine 110 is started.

Reference Signs List
- 100 Engine System
- 110 Engine
- 120 Starter Motor
- 130 Transformer
- 131 Primary of Transformer
- 132*a* Secondary of Transformer
- 132*b* Shared Secondary Shared with Primary of Transformer
- 133 Path of Primary of Transformer
- 134 Terminal in Path of Primary of Transformer
- 135 Another Terminal in Path of Primary of Transformer
- 136 Branch Terminal of Primary of Transformer
- 140 Power Receiving Device
- 141 Power Receiving Terminal of Power Receiving Device
- 142 Another Power Receiving Terminal of Power Receiving Device
- 150 Switcher
- 151 Switching Terminal
- 152 First Terminal
- 153 Second Terminal
- 200 Alternating-current Power supply
- Va Power Supply Voltage
- Vb Voltage Applied to Power Receiving Device
- Vc Voltage across Two Terminals in Shunt Winding Path
- Vd Driving Voltage

The invention claimed is:

1. An engine system comprising:
a starter motor that starts an engine;
a transformer in which a driving voltage to the starter motor is an output of a secondary and a branch terminal is provided along a path of a primary;
a power receiving device that receives a voltage supplied from an alternating-current power supply; and
a switcher that connects a switching terminal that is connected to one power receiving terminal of the power receiving device to either a first terminal that is connected to one of two terminals in the path of the primary or a second terminal that is connected to the branch terminal of the transformer,
wherein the other power receiving terminal of the power receiving device and the other of the terminals in the path of the primary are connected,
the terminals in the path of the primary and the alternating-current power supply are electrically connected, and
an open/close relay is provided in at least one of connecting paths between the terminals in the path of the primary and the alternating-current power supply, the one power receiving terminal of the power receiving device and the second terminal of the switcher are connected if the open/close relay is closed, and the one power receiving terminal of the power receiving device and the first terminal of the switcher are connected if the open/close relay is open.

* * * * *